(12) United States Patent
Sahibzada

(10) Patent No.: US 12,546,686 B2
(45) Date of Patent: Feb. 10, 2026

(54) DEVICE FOR SENSING A FLUID

(71) Applicant: CALECTRO AB, Askim (SE)

(72) Inventor: Jorgen Sahibzada, Molndal (SE)

(73) Assignee: CALECTRO AB, Askim (SE)

( * ) Notice: Subject to any disclaimer, the term of this patent is extended or adjusted under 35 U.S.C. 154(b) by 302 days.

(21) Appl. No.: 18/257,048

(22) PCT Filed: Dec. 10, 2021

(86) PCT No.: PCT/EP2021/085291
§ 371 (c)(1),
(2) Date: Jun. 12, 2023

(87) PCT Pub. No.: WO2022/123053
PCT Pub. Date: Jun. 16, 2022

(65) Prior Publication Data
US 2024/0044752 A1    Feb. 8, 2024

(30) Foreign Application Priority Data

Dec. 11, 2020  (EP) .................................... 20213445

(51) Int. Cl.
*G01N 1/22* (2006.01)

(52) U.S. Cl.
CPC ... *G01N 1/2247* (2013.01); *G01N 2001/2291* (2013.01)

(58) Field of Classification Search
CPC ......... G01N 1/2247; G01N 2001/2291; G01N 1/22; G01N 2001/2285; G01N 1/2258; G08B 17/113
USPC ........ 73/32 R, 32 A, 433–454, 61.59, 64.56, 73/204.22, 756, 861.42–861.52, 863.02, 73/864.33, 864.34, 864.73, 866.5, 431; 374/147, 148, 208
See application file for complete search history.

(56) References Cited

U.S. PATENT DOCUMENTS

| | | | |
|---|---|---|---|
| 3,803,920 | A | 4/1974 | Homolya et al. |
| 5,844,148 | A | 12/1998 | Klein et al. |
| 2008/0257011 | A1 | 10/2008 | Sahibzada et al. |
| 2011/0081852 | A1 | 4/2011 | Sahibzada |
| 2013/0255357 | A1 | 10/2013 | Anderson et al. |
| 2016/0139008 | A1 | 5/2016 | Williamson |

OTHER PUBLICATIONS

International Search Report and Written Opinion of the International Searching Authority for International Application No. PCT/EP2021/085291 dated Feb. 24, 2022.

*Primary Examiner* — Robert R Raevis
(74) *Attorney, Agent, or Firm* — Harness, Dickey & Pierce, P.L.C.

(57) ABSTRACT

The present invention relates to a device for sensing a fluid comprising: a first portion adapted to be arranged in a fluid duct, said first portion comprising a multiple flow pipe comprising a longitudinal axis, said multiple flow pipe adapted for being arranged in the fluid duct such that said longitudinal axis is substantially perpendicular to a fluid flow direction in the fluid duct; a second portion comprising a housing and a sensor arranged in said housing; an axial connector arranged in contact with said first portion and said second portion, wherein said axial connector permits arrangement of said second portion at a plurality of positions in relation to said first portion and wherein in each one of said plurality of positions said first portion and said second portion are fluidly connected.

13 Claims, 4 Drawing Sheets

DEVICE FOR SENSING A FLUID

CROSS-REFERENCE TO RELATED APPLICATIONS

This application is a national phase under 35 U.S.C. § 371 of PCT International Application No. PCT/EP2021/085291 which has an International filing date of Dec. 10, 2021, which claims priority to European Application No. 20213445.8, filed Dec. 11, 2020, the entire contents of each of which are hereby incorporated by reference.

BACKGROUND OF THE INVENTION

In order to in a reliable way sense e.g. particles or gases in fluids, such as a fluid in a ventilation duct, it is advantageous to install a sensor device directly in contact with or partially inside the duct. Different solutions exist, among which US2008257011 may be mentioned. In said document, a device for sensing fluids is disclosed where a multiple flow pipe is arranged in the duct, and the sensor is arranged on the duct.

However, there are drawbacks with the current technology. Problems arise from the particular setting in which the device is to be installed. In particular, it is often the specific geometry and spatial constraints that prove challenging.

SUMMARY OF THE INVENTION

It is thus in view of the above a need for an improved device for sensing fluids that is flexible and adaptable in dealing with the aforementioned problems.

A device for sensing a fluid comprising: a first portion adapted to be arranged in a fluid duct, the first portion comprising a multiple flow pipe comprising a longitudinal axis, the multiple flow pipe adapted for being arranged in the fluid duct such that the longitudinal axis is substantially perpendicular to a fluid flow direction in the fluid duct; a second portion comprising a housing and a sensor arranged in the housing; an axial connector arranged in contact with the first portion and the second portion, wherein the axial connector permits arrangement of the second portion at a plurality of positions in relation to the first portion and wherein in each one of the plurality of positions the first portion and the second portion are fluidly connected.

By having a device for sensing fluid where the housing comprising the sensor may be arranged at a plurality of positions in relation to the multiple flow pipe arranged in a fluid duct, a more versatile device is provided.

A plurality of position of the second portion in relation to the first portion is to be understood as different positions in which the second portion e.g. is placed at different angles with respect to a longitudinal axis of the first portion.

A multiple flow pipe is to be understood as a pipe having channels accommodating fluid flow in at least two different directions. A multiple flow pipe may therefore comprise one channel for fluid flowing in a first direction, and one further channel for fluid flowing in a second direction. Alternatively, a multiple flow pipe may comprise one channel for fluid flowing in a first direction, and two further channels for fluid flowing in a second direction.

The multiple flow pipe may e.g. be a venturipipe.

A sensor may be a smoke sensor, chemical sensor, flow sensor etc.

The second portion may be arranged at the positions in a variety of ways, such as being snap-fitted to the axial connector, screwed on to the axial connector etc. The axial connector as such may comprise means for receiving the second portion. For example, the axial portion may comprise tracks in which the second portion may be fitted. In some embodiments, the axial connector comprises a rim portion having an upper surface, wherein the second portion is arranged in contact with the upper surface.

According to an exemplary embodiment, the second portion is adapted to rotate between the plurality of positions.

Since the axial connector permits rotation of the second portion in relation to the first portion and fluidly connects the portions, the portions are fluidly connected regardless of their relative positions. Thus, a more flexible, adaptable and user-friendly device is provided.

The second portion may be adapted to rotate 360° around an axis of rotation. As such, the axial connector may permit rotation of 360° of the second portion.

According to an exemplary embodiment, the axial connector comprises a first and a second flow chamber, wherein the first flow chamber is connected to a first channel of the multiple flow pipe and the second flow chamber is connected to a second channel of the multiple flow pipe.

As such, a fluid flow in the first flow chamber is separated from a fluid flow in the second flow chamber.

The two flows may have flow directions which are substantially perpendicular to a plane of rotation of the rotatable connector, and further substantially opposite to each other. By having the two directions being substantially perpendicular to the plane of rotation of the rotatable connector, rotating the connector does not alter, or at least does not substantially alter, the flow characteristics of the fluid flowing through the rotatable connector.

In some embodiments, the second flow chamber is arranged around the first flow chamber. That the second flow chamber is arranged around the first flow chamber does not necessarily mean that the second flow chamber completely surrounds the first flow chamber.

According to an exemplary embodiment, the axial connector is substantially circular and comprising a central axis, and wherein a rotational axis of the second portion is parallel to and coinciding with the central axis.

The second portion may e.g. be arranged at a continuum of rotational positions around the central axis of the axial connector.

According to an exemplary embodiment, the first flow chamber comprises a first opening adapted to be connected to the first channel of the multiple flow pipe and a second opening adapted to be connected to the second portion, wherein the second opening is substantially symmetrical around the central axis of the axial connector.

Thus, the fluid flow in the first flow amber is independent of the angular position of the second portion around the rotational axis. As such, the second portion may be arranged at any angular position around the rotational axis in relation to the first portion.

According to an exemplary embodiment, the housing further comprises a first and a second cavity; wherein the first cavity form a sensor inlet adapted to lead fluid to the sensor and second cavity form sensor outlet adapted to lead fluid from the sensor when the sensor is arranged in the housing, wherein the sensor inlet is fluidly connected to the first flow chamber and the sensor outlet is fluidly connected to the second flow chamber.

By having a housing forming the sensor inlet and the sensor outlet when the sensor is arranged within the housing, a more compact and material-efficient device is provided.

The first and second housing channel may be arranged on substantially opposite sides of the sensor.

Thus, the fluid will not substantially change directions when flowing through the sensor. As such, there is less loss of fluid momentum.

That the sensor inlet is fluidly connected to the first flow chamber and the sensor outlet is fluidly connected to the second flow chamber does not exclude that the sensor inlet may be fluidly connected to the sensor outlet.

According to an exemplary embodiment, the second portion comprises a through-hole adapted to receive a fastening means such that the second portion is adapted to be fastened to the duct.

Means for fastening may e.g. include nails, screws or rivets.

As such, the second portion may be arranged in any angular position around the central axis of the axial connector and still being adapted to be fastened to the duct.

According to an exemplary embodiment, the axial connector further comprises a circumferential slit and an o-ring arranged within the slit.

By providing the axial connector with a circumferential slit and an o-ring arranged within the slit, it is further insulated with regards to fluid leakage while still allowing rotation of the second portion about the central axis.

According to an exemplary embodiment, the first portion is attached in a rotationally fixed manner to the axial connector and the second portion is rotatably attached to the axial connector.

According to a second aspect of the present invention a method for installing a device for sensing a fluid on a fluid duct is provided, the method comprising: providing a first portion adapted to be arranged in a fluid duct, the first portion comprising a multiple flow pipe, a second portion comprising a housing and a sensor arranged in the housing, and an axial connector adapted to be arranged in contact with the first portion and the second portion such that the first portion and the second portion are fluidly connected, and wherein the axial connector permits rotation of the second portion in relation to the first portion; assembling the first portion, second portion and the axial connector, thereby providing a device according to the first aspect of the present invention; and fastening the device to the fluid duct such that the position of the second portion is fixed in relation to the first portion and such that the device is installed on the fluid duct.

The device, according to the first aspect of the present invention, is adapted such that the second portion may be arranged at a plurality of positions. As such, the method according to the second aspect of the present invention allows for a versatile installation of a device. The device may e.g. be installed in a variety of environments where only a subset of the plurality of positions are possible.

According to an exemplary embodiment, the method further comprises rotating the second portion from a first position in relation to the first portion to a second position in relation to the first portion before fastening the device to the fluid duct.

By rotating the second portion from one position to the other, the method allows for easy adaptation of the installation based on the environment in which the device is to be installed.

According to an exemplary embodiment, assembling further comprises: connecting the first portion and the second portion to the axial connector, thereby providing a device according to the first aspect of the present invention.

According to an exemplary embodiment, assembling further comprises: arranging the first portion of the device in the fluid duct; connecting the axial connector to the first portion; and connecting the second portion to the axial connector, thereby providing a device according to the first aspect of the present invention.

Connecting the axial connector to the first portion and connecting the second portion to the axial connector may be performed in any order. According to an exemplary embodiment, the method further comprises connecting said axial connector to said first portion in a rotationally fixed manner, and connecting said second portion to said axial connector such that said second portion is rotatably attached to said axial connector.

BRIEF DESCRIPTION OF THE DRAWINGS

For exemplifying purposes, the invention will be described in closer detail in the following with reference to exemplary embodiments thereof illustrated in the attached drawings, wherein:

FIG. 3 is a perspective view of the axial connector of the device in

FIG. 1.

DETAILED DESCRIPTION OF THE INVENTION

In the following detailed description, some embodiments of the present invention will be described. It is however to be understood that, unless anything else is specifically indicated, features of the different embodiments are exchangeable between the embodiments and may be combined in different ways. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
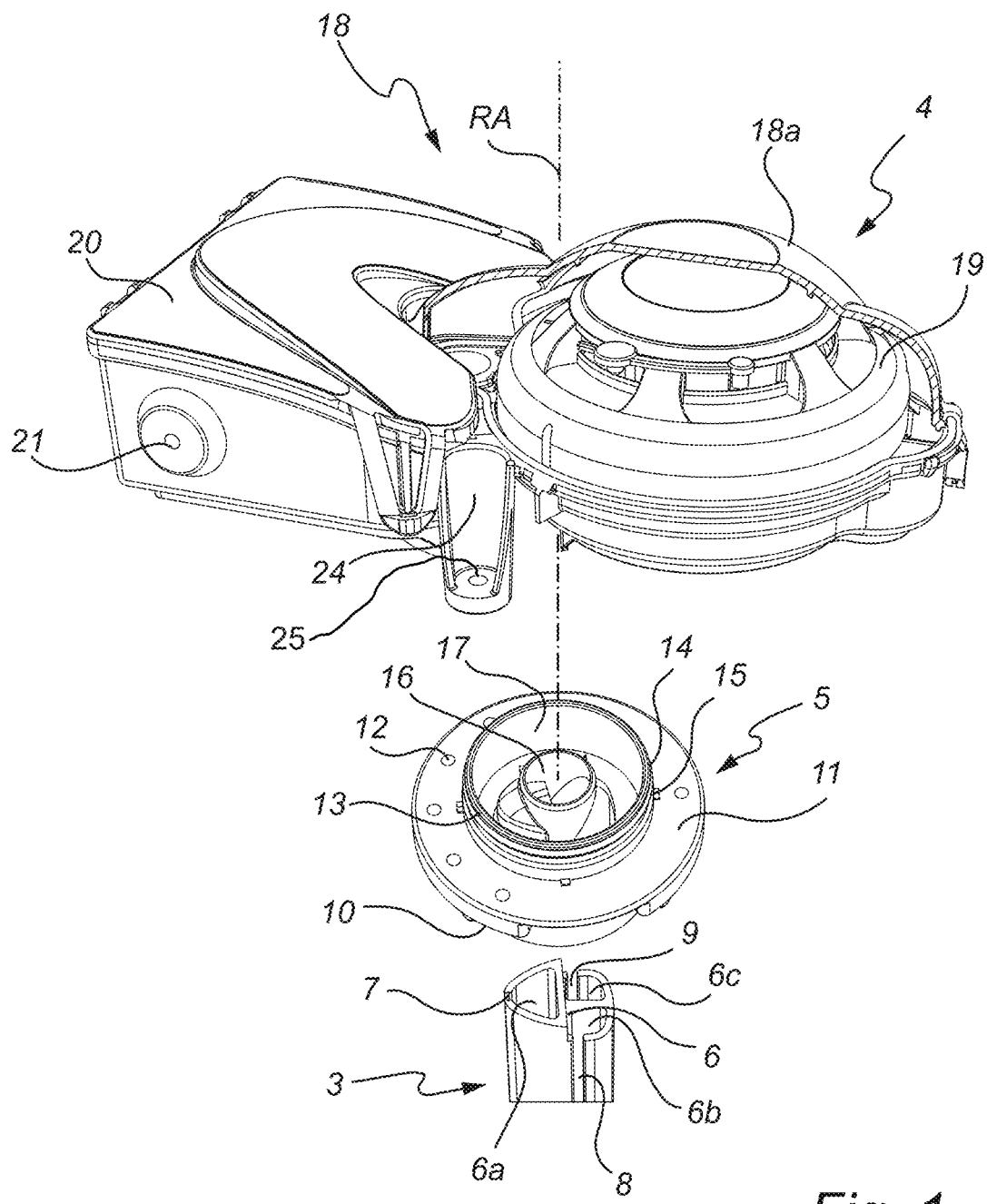
FIG. 1 is a perspective exploded view of a device according to the first aspect of the present invention.

FIG. 1 shows the device 1 comprising a first portion 3, a second portion 4 and an axial connector 5 comprising a central axis CA.

The first portion 3 comprises a multiple flow pipe 6. The multiple flow pipe 6 is here shown to comprise a first channel 6a adapted to permit flow of fluid in a first direction, and a second and a third channel 6b,6c both adapted to permit flow of fluid in a second direction, wherein the second direction is substantially opposite to the first direction. The multiple flow pipe 6 comprises a first slit 7 forming an opening to the first channel 6a. The slit 7 may e.g. extend along the entire length of the first channel 6a. Alternatively, the slit 7 may extend along a portion of the length of the first channel 6a. The multiple flow pipe 6 further comprises a second and a third slit 8,9. Correspondingly, the second and the third slit 8,9 may e.g. extend along the entire length of the second and third channel 6b,6b. Alternatively, the second and the third slit 8,9 may extend along a portion of the length of the second and third channel 6b,6b. The slits 7,8,9 are adapted to permit passage of fluid between an exterior of the multiple flow pipe 6, such as the inside of a duct (not shown), and the respective channels 6a,6b,6b.

The axial connector 5 is adapted to be attached to the first portion 3 and the second portion 4. The axial connector 5 comprises a lower opening adapted to receive the multiple flow pipe 6 such that the channels 6a,6b,6b are arranged within the axial connector 5. The first portion 3 may be attached in a rotationally fixed manner to the axial connector 5, i.e. the first portion 3 is attached to the axial connector 5 in a way such that it does not rotate. As such, the position and orientation of first portion 3, when attached to the axial connector 5, is fixed in relation to the axial connector 5. Hereby, the position and orientation of the first portion 3 is fixed in relation to a flow in the duct to which the device is mounted. The second portion 4 is rotatably attached to the axial connector 5, i.e. the second portion 4 is attached to the axial connector 5 such that rotation of the second portion 4 is permitted.

The axial connector 5 further comprises a radial rim portion 11, extending in a radial direction in relation to the central axis CA, the radial rim portion 11 comprising a plurality of through-holes 12.

The axial connector 5 further comprises an axial rim portion 13, extending in an axial direction in relation to the central axis CA, i.e. along the central axis CA. The axial rim portion 13 is adapted to be arranged in the second portion 4 such that the axial connector 5 is connected to the second portion 4. The axial rim portion 13 further comprises a circumferential slit 14 in which an o-ring 15 is arranged. The o-ring 15 is adapted to fluidly insulate between the axial rim portion 13 and the second portion 4 such that leakage of fluid is prevented, or at least minimized, regardless of the angular position of the second portion 4 in relation to the first portion 3 and the axial connector 5.

The axial connector 5 further comprises a first flow chamber 16 and a second flow chamber 17. The first flow chamber 16 is arranged such that it coincides with the central axis CA, and the second flow chamber 17 is arranged around the first flow chamber 16. The first flow chamber 16 is adapted to be fluidly connected to the first channel 6a of the multiple flow pipe 6, whereas the second flow chamber 17 is adapted to be fluidly connected to the second and third channels 6b,6c of the multiple flow pipe 6, when the multiple flow pipe 6 is arranged in the lower opening 10.

The second portion 4 is adapted to be rotated around a rotational axis RA. Preferably, the second portion 4 is rotatable 360° around the rotational axis RA. The rotational axis RA of the second portion 4 is further parallel with a longitudinal axis of the multiple flow pipe 6 and the central axis CA of the axial connector 5. The second portion 4 is as such adapted to slide on the radial rim portion 11 of the axial connector 5, so that the second portion 4 is rotated around the rotational axis RA.

The second portion 4 further comprises a housing 18 and a sensor 19 arranged within the housing 18. The sensor 19 may be a smoke sensor, chemical sensor, flow sensor etc.

The housing 18 further comprises a removable cap 18a adapted to surround the sensor 19 when the sensor 19 is arranged in the housing 18. The removable cap 18a may e.g. be made of a flexible, hard plastic.

The housing 18 further comprises an electronic housing 20, the electronic housing comprising an electrical and/or electronic interconnect 21. The electronic housing 20 is adapted to be in electrical and/or electronic contact with the sensor 19, such that detection signals produced by the sensor 19 may be transmitted to the electronic housing 20 and through the electrical and/or electronic interconnect 21 such that the detection signals may be read by e.g. a computer (not shown).

The housing 18 further comprises an attachment portion 24 comprising a through-hole 25. The through-hole 25 of the attachment portion 24 is adapted to receive a fastening means (not shown) such that the second portion 4 may be fastened to a duct (not shown).

Figure 2:
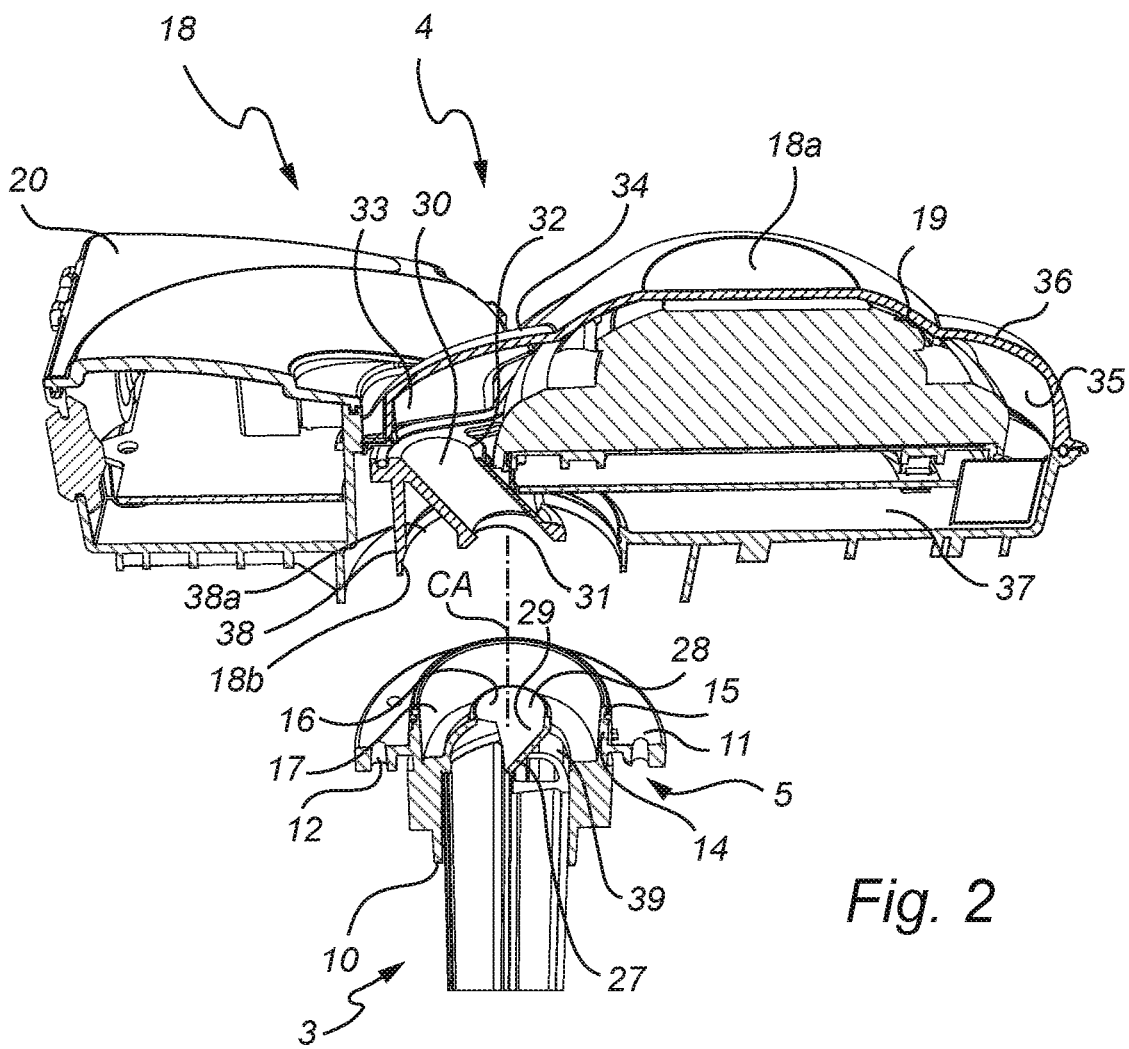
FIG. 2 is a perspective cross-sectional view of the device in FIG. 1.

FIG. 2 shows a cross-sectional view of the device 1. As such, the axial connector 5 is also shown from a cross-section perspective. The first flow chamber 26 comprises a first opening 27 and a second opening 28, wherein the first opening 27 is arranged closer to the first portion 3 whereas the second opening 28 is arranged closer to the second portion 4. The first opening 27 and the second opening 28 are further arranged radially offset from each other in relation to the central axis CA. Here, the first opening 27 is arranged further from the central axis CA than the second opening 28. Here, the second opening 28 is arranged symmetrically around the central axis CA. However, the second opening 28 does not need to be arranged symmetrically around the central axis CA. The axial connector 5 further comprises a slanted surface 29 extending from the first opening 27 to the second opening 28. The first opening 27 is adapted to be connected to the first channel 6a of the multiple flow pipe 6, and the second opening 28 is adapted to be connected to a first housing channel 30. As such, when the axial connector 5 is connected to the multiple flow pipe 6 of the first portion 3 and the first housing channel 30 of the second portion 4, the first portion 3 is fluidly connected to the second portion 4. The second opening 28 of the axial connector 5 is adapted to be fitted against the a first opening 31 of the first housing channel such that fluid may pass between the first housing channel 30 and the first flow chamber 16 without any substantial leakage.

The first housing channel 30 further comprises a second opening 32 connected to a sensor inlet 33. The sensor inlet 33 is formed by a first cavity 34 of the removable cap 18a when the sensor 19 is arranged within the housing 18. Furthermore, a sensor outlet 35 is formed by a second cavity 36 of the removable cap 18a when the sensor 19 is arranged within the housing 18. The sensor outlet 35 is fluidly connected to a second housing channel 37. The second housing channel 37 is further connected to an opening 18b of the housing defined by a circular protrusion 38. The circular protrusion 38 is adapted to abut on the axial rim portion 13 when the second portion 4 is connected to the axial connector 5. Specifically, the circular protrusion 38 comprises a tapered surface 38a adapted to receive the axial rim portion 13. The o-ring 15 thus insulates against fluid leakage when the axial rim portion 13 has been received by the tapered surface 38a and thus is arranged within the opening 18b of the second portion 4.

The second housing channel 37 is thus fluidly connected to the second flow chamber 17 of the axial connector 5 such that, when the axial connector 5 is connected to the second portion 4, the sensor outlet 35 is fluidly connected to the second flow chamber 17.

The second flow chamber 17 is arranged around the first flow chamber 16 and further comprises an opening 39. The opening 39 is adapted to be connected to the second and the third channel 6b,6c of the multiple flow pipe 6. As such, when the axial connector 5 is connected to the multiple flow pipe 6, and when the axial connector 5 is connected to the housing 18 when the sensor 19 is arranged within the housing 18, the second and the third channel 6b,6c is fluidly connected to the sensor outlet 35.

Figure 3:
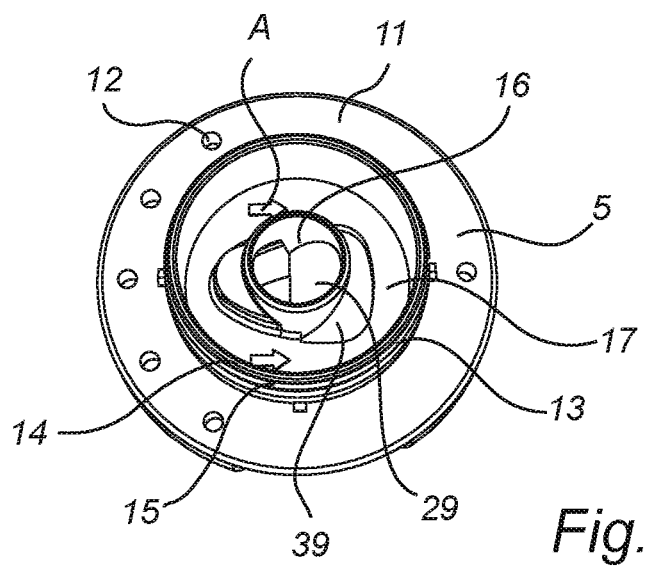

In FIG. 3 the axial connector 5 is shown in more detail. The arrow A indicates the direction of flow of the fluid in a duct on which the device 1 is to be mounted. As such, the arrow A indicates how the axial connector 5 is to be mounted in relation to the duct.

Figure 4:
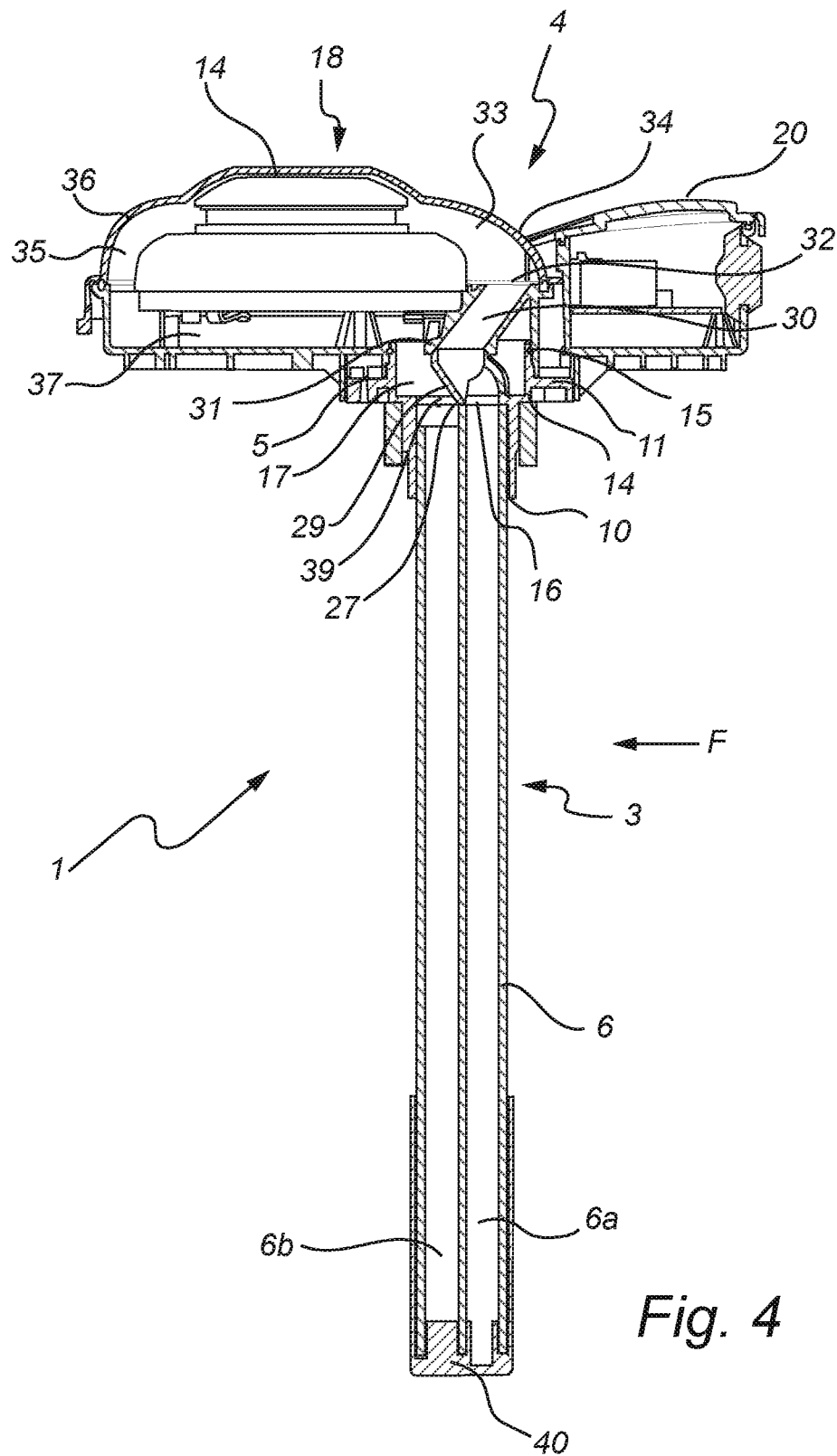
FIG. 4 is a cross-sectional view of the device in FIG. 1 when the device is assembled.

In FIG. 4, a cross-section of the assembled device 1 is shown. The first channel 6a of the first portion 3 is adapted to lead fluid into the first flow chamber 16 of the axial connector 5. The flow direction of the fluid before entering the channel 6a is indicated by the arrow F. Here, a distal cap 40 arranged at a distal end of the multiple flow pipe 6 is shown. The distal cap 40 prevents fluid from leaving through the distal end of the multiple flow pipe 6. The axial connector 5 is in turn adapted to lead fluid into the first housing channel 30 of the housing 18, which in turn is adapted to lead fluid into the sensor inlet 33. The sensor inlet 33 is adapted to lead the fluid into the sensor 19, in which the fluid is analysed depending on what type of sensor 19 is arranged in the housing 18. The fluid may e.g. be analysed in order to find a certain chemical compound in the fluid, or in order to measure density or flow speed of the fluid. The fluid may e.g. be analysed while flowing through the sensor 19. When the fluid has been analysed by the sensor 19, the fluid is lead to the sensor outlet 35 and then further to the second housing channel 37, which in turn is adapted to lead the fluid into the second flow chamber 17. The second flow chamber 17 is adapted to lead the fluid into the second and third channel 6b,6c, such that the second and third channel second and third channel 6b,6c permits exit of the fluid from the device to the duct (not shown).

Figure 5:
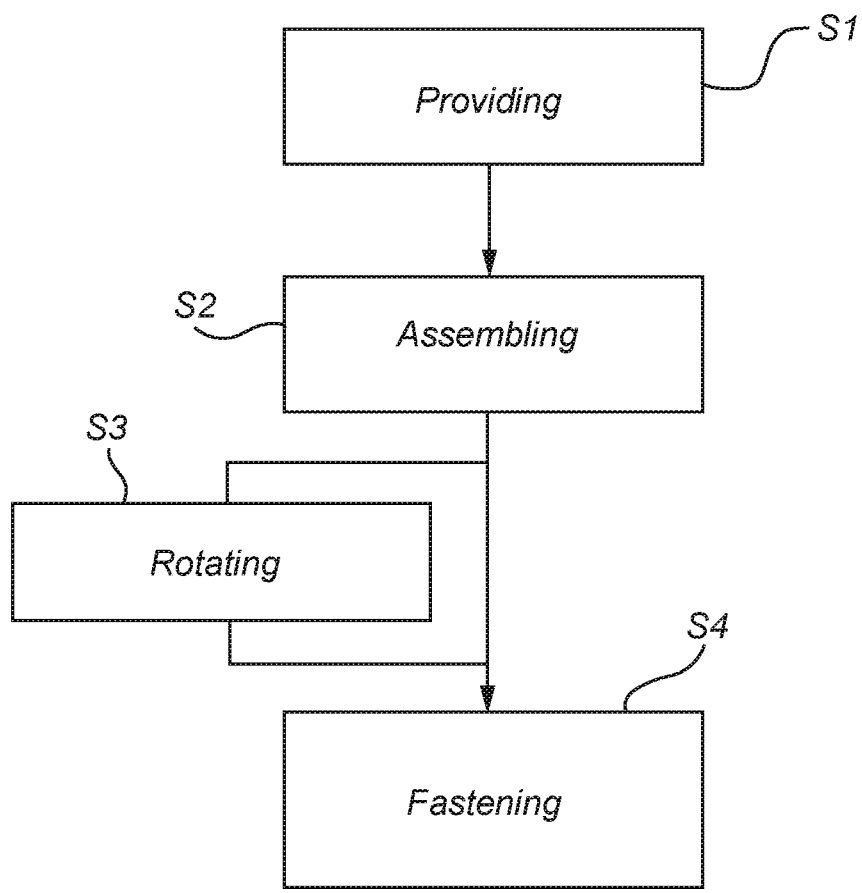
FIG. 5 is a flow diagram illustrating the method of installing a device for sensing a fluid on a fluid duct.

FIG. 5 is a flow diagram illustrating the method according to the second aspect of the present invention. First, a first portion 3 adapted to be arranged in a fluid duct (not shown), the first portion comprising a multiple flow pipe 6, a second portion 4 comprising a housing 18 and a sensor 19 arranged in the housing 18, and an axial connector 5 adapted to be arranged in contact with the first portion 3 and the second portion 4 such that the first portion 3 and the second portion 4 are fluidly connected, are provided S1. The axial connector 5 permits rotation of the second portion 4 in relation to the first portion 3. Subsequently, the first portion 3, second portion 4 and the axial connector 5 are assembled S2, thereby providing a device 1 according to the first aspect of the present invention. The device 1 is then fastened S4 to the fluid duct such that the position of the second portion 4 is fixed in relation to the first portion 3 and such that the device 1 is installed on the fluid duct.

The method may further comprise the step of rotating S3 the second portion 4 in relation to the first portion 3, such that the second portion 4 is arranged in any given angular position around a rotational axis RA of the second portion 4. Thus, during the subsequent step of fastening S4, the position of the second portion 4 in relation to the first portion 3 achieved by the step of rotating S3 is fixated.

During the step S1, the first portion 3, the second portion 4 and the axial connector 5 are provided separately and adapted to be connected to each other such that they are assembled.

During the step of assembling S2, the first portion 3, the second portion 4 and the axial connector 5 are connected to each other such that a device 1 according to the first aspect of the present invention is assembled. By assembling 2 the device 1, the first portion 3, the second portion 4 and the axial connector 5 are fluidly connected to each other. The device 1 may be assembled 2 in different ways. For example, the second portion 4 may be connected to the axial connector 5, which in turn is subsequently connected to the first portion 3. Alternatively, the first portion 3 is connected to the axial connector 5, which in turn is subsequently connected to the second portion 4. The step of assembling S2 may further comprise arranging S2a the first portion 3 in the fluid duct, after which the axial connector 5 is connected S2b to the first portion 3. Subsequently, the second portion 4 is connected S2c to the axial connector 5.

During the step of fastening S4, the device 1 is fastened to the fluid duct. This may be done in different ways. For example, the second portion 4 may be fastened to the axial connector 5, which in turn is fastened to the fluid duct. Alternatively, the second portion 4 and the axial connector 5 may be fastened to the fluid duct at the same time, i.e. in one step, e.g. by having one fastening means such as a nail, a screw or a rivet fastening both the second portion 4 and the axial connector 5 to the fluid duct. Alternatively, only the second portion 4 is fastened to the fluid duct.

The invention has now been described with reference to specific embodiments. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A device for sensing a fluid, the device comprising:
a first portion adapted to be arranged in a fluid duct, the first portion comprising a multiple flow pipe comprising a longitudinal axis, said multiple flow pipe having a plurality of channels configured to accommodate fluid flow of the fluid in at least two directions, said multiple flow pipe adapted for being arranged in the fluid duct such that said longitudinal axis is substantially perpendicular to a fluid flow direction in the fluid duct;
a second portion comprising a housing and a sensor arranged in said housing; and
an axial connector arranged in contact with said first portion and said second portion, wherein said axial connector permits arrangement of said second portion at a plurality of positions in relation to said first portion and wherein in each one of said plurality of positions said first portion and said second portion are fluidly connected,
wherein said first portion is attached in a rotationally fixed manner to said axial connector and said second portion is rotatably attached to said axial connector.

2. The device according to claim 1, wherein said second portion is adapted to rotate between said plurality of positions.

3. The device according to claim 2, wherein said second portion is adapted to rotate 360° around an axis of rotation.

4. The device according to claim 1, wherein said axial connector comprises a first flow chamber and a second flow chamber, wherein said first flow chamber is connected to a first channel of said multiple flow pipe and said second flow chamber is connected to a second channel of said multiple flow pipe.

5. The device according to claim 4, wherein said second flow chamber is arranged around said first flow chamber.

6. The device according to claim 5, wherein said axial connector is substantially circular and comprising a central axis, and wherein a rotational axis of said second portion is coinciding with said central axis of the axial connector.

7. The device according to claim 6, wherein said first flow chamber comprises a first opening adapted to be connected to said first channel of said multiple flow pipe and a second opening adapted to be connected to said second portion, wherein said second opening is substantially symmetrical around said central axis of said axial connector.

8. The device according to claim 4, wherein said housing further comprises a first cavity and a second cavity;
wherein said first cavity forms a sensor inlet adapted to lead the fluid to said sensor and said second cavity forms a sensor outlet adapted to lead the fluid from said sensor when said sensor is arranged in said housing, wherein said sensor inlet is fluidly connected to said first flow chamber and said sensor outlet is fluidly connected to said second flow chamber.

9. The device according to claim 1, wherein said axial connector further comprises a rim portion having an upper surface, wherein said second portion is arranged in contact with and adapted to slide on said upper surface.

10. The device according to claim 1, wherein said second portion comprises a through-hole adapted to receive a fastening means such that said second portion is adapted to be fastened to said fluid duct, the fastening means including a nail, a screw, or a rivet.

11. The device according to claim 1, wherein said axial connector further comprises a circumferential slit and an o-ring arranged within said circumferential slit.

12. A method for installing a device for sensing a fluid on a fluid duct, the method comprising:

providing a first portion adapted to be arranged in the fluid duct, said first portion comprising a multiple flow pipe, a second portion comprising a housing and a sensor arranged in said housing, and an axial connector adapted to be arranged in contact with said first portion and said second portion such that said first portion and said second portion are fluidly connected, said multiple flow pipe having a plurality of channels configured to accommodate fluid flow of the fluid in at least two directions, and wherein said axial connector permits arrangement of said second portion at a plurality of positions in relation to said first portion;

assembling said first portion, said second portion and said axial connector, the assembling including connecting said first portion and said second portion to said axial connector such that said second portion is rotatably attached to said axial connector, arranging said first portion of said device in said fluid duct, connecting said axial connector to said first portion in a rotationally fixed manner, and connecting said second portion to said axial connector, thereby providing the device according to claim 1; and fastening said device to said fluid duct such that a position of the second portion is fixed in relation to said first portion and such that said device is installed on said fluid duct.

13. The method according to claim 12, further comprising rotating said second portion from a first position in relation to said first portion to a second position in relation to said first portion before fastening said device to said fluid duct.

* * * * *